F. J. BERTRAND.
COMBINED THORN STRIPPER AND CUTTER.
APPLICATION FILED DEC. 29, 1919.

1,359,148. Patented Nov. 16, 1920.

INVENTOR
FREDERIC J. BERTRAND
BY
Baldwin Vale
ATTORNEY

UNITED STATES PATENT OFFICE.

FREDERIC J. BERTRAND, OF SAN FRANCISCO, CALIFORNIA.

COMBINED THORN STRIPPER AND CUTTER.

1,359,148.	Specification of Letters Patent.	Patented Nov. 16, 1920.

Application filed December 29, 1919. Serial No. 347,946.

*To all whom it may concern:*

Be it known that I, FREDERIC J. BERTRAND, a citizen of the United States, and a resident of the city and county of San Francisco, State of California, have made a new and useful Improvement in Combined Thorn Strippers and Cutters; and I do hereby declare the following to be a full, clear, concise, and exact description of the same.
This invention relates particularly to instruments for removing thorns from the stems of roses and other flowers.

An object of this invention is to provide an instrument for removing thorns from rose stems without danger to the hands of the operator, and further that the strippers will be superior in point of simplicity and inexpensiveness of construction, positiveness of operation, facility and convenience in use and general efficiency, the use of which will not cause injury to or bruise the rose stems.

A further object is to provide a combined thorn stripper and cutter in the same instrument permitting the tool to be used either as a medium for stripping thorns from the rose stalk or as a shears for severing the rose stalk in half or cutting away a projecting knot on the stem.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the accompanying one sheet of drawings,

Figure 6:
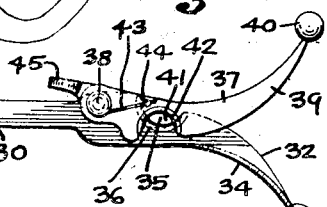

Fig. 6 is a plan view of a modified form of thorn stripper and cutter.
Roses sold by the floral trade as a matter of trade practice, generally have the thorns removed from the stalks, which eliminates the annoyance caused by the thorns pricking the hands of any one handling the stems. The methods used in removing the thorns are very unsatisfactory in that the instruments used are of such a make-shift nature that the rose stem bark is either bruised and cut, shortening the life of the flower so that it will not be properly nourished when placed in water or the body of the stem broken so that the flower will not be supported by the stalk. Roses that have been bruised or injured in this manner are a lost profit to the florist and it is the object of my invention to provide an instrument which will prevent any damage resulting to the stem which has heretofore been the result of using crude tools for this purpose.

In detail the construction illustrated in the drawings includes a florists standard shears of any type purchasable on the open market and comprised of the cutting jaws 1 and 2, cross pivoted at 3, with the handles 4 and 5 respectively formed integrally thereon. In adapting my invention to the shears, the cutting blade 1 is provided with the extension member 6 terminating in the outwardly flaring end 7 and provided with a counter balancing medium 8 on the end thereof. The counter-balances 8 and 14 comprise suitable weights attached to or integrally formed on the tips of the flaring ends 7 and 13 for the purpose of adding their weight to the momentum of the downward movement of the combined cutter and stripper during either the cutting or stripping operation. The member 6 is secured to the shear blade 1 by welding or by passing machine screws therethrough. Adjacent the end of the shear blade 1 the member 6 is provided with the curved gap 9 formed in the inner side thereof and is provided with the thorn cutting knives 10 and 11 respectively, formed on the opposite faces of the member 6.

For convenience and to avoid a multiplication of parts in the construction of this device it is within the purview of the invention to integrally form the shear and extension member, thus providing a conventional shear in combination with the thorn stripping jaw.

Figure 5:
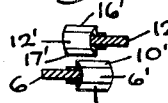
Fig. 5 is a cross section taken on the line V—V of Fig. 1.

The shear blade 2 is provided with the extension 12, a duplicate of and which partially overlaps the member 6 and curved gap 9, and has the outwardly flaring end 13 terminating in the counter balancing means 14 on the end thereof. The member 12 is provided with the curved gap 15 adjacent the end of the shear 2, which curved gap is in juxtaposition with the curved gap 9 formed in the member 6. The curved gaps 9 and 15 in the members 6 and 12 respectively, thus overlap and pass each other which preferably leaves a small aperture, when the shear blades 1 and 2 are normally closed. Contiguous to the edges of the curved gap 15 the member 12 is provided with the thorn cutting knives 16 and 17 on opposite faces thereof. Each of the thorn stripping knives 10 and 11 formed on opposite faces of the member 6 and the knives 16 and 17 formed on opposite faces of the member 12 are set back from the edges of the gaps 9 and 15, respectively, and are contiguous thereto as is clearly shown by the cross section illustrated in Fig. 5. This construction is necessary by reason of the fact that the surfaces 6' and 12' respectively are soft edges, which are adapted to slide against the body of the rose stem, and the beveled sides of the cutting knives 10', 11', 16' and 17', which slope away from the surfaces 6' and 12' respectively, cause the cutting edges 10, 11, 16 and 17 to slide over any small, natural, irregularity on the rose stem, but which strips the thorns from the stalk when the same are encountered. To permit the adjacent thorn stripping knives 10 and 17, formed respectively on the members 6 and 12, to pass each other it is necessary to offset each of the members 6 and 12, as shown at 24 and 25.

The extension member 12 is pivotally mounted on the shear blade 2 by means of the pivot pin 16, threaded to engage a drilled and tapped hole formed in the shear 2, having the shoulder 17 bearing against the upper face of the member 12 and which is provided with a reduced body portion in which the spring 18 is retained by the cap 19, formed integrally on the pivot pin. The tension spring 18 is wrapped around the pivot pin 16 and has an end thereof rigidly positioned therein. The other end extends through the pin 20, which passes through the member 12 and which abuts against the shear blade 2, limiting the pivotal movement thereof. The end of the member 12 extends upwardly at 21 to provide a finger grip for opening the member 12 from closed position in which position it is normally held by the tension of the spring 18.

Figure 4:
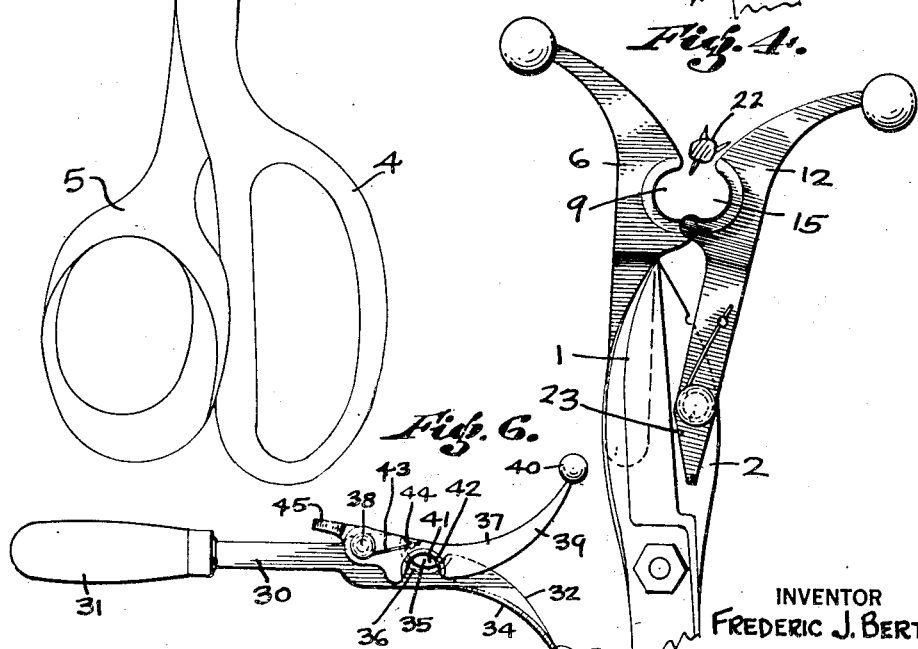
Fig. 4 is a view of the shears closed and the thorn strippers partly opened to receive a rose stalk.

In Fig. 4 I have illustrated the strippers in open position to receive the stem of a rose 22 which enters the curved gaps 9 and 15. The outward radial swing of the member 12 is limited by the degree of bevel 23 provided on the end thereof. By altering the degree of bevel the width of opening to the curved gaps can be thus regulated. Forming the stop 23 at this particular point enables the cutting edge of the blade 1 to be utilized as an abutment against which the stop 23 can be brought into contact.

Figure 1:
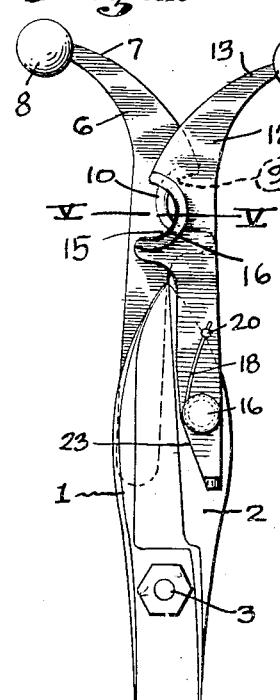
Figure 1 is a plan view of a standard flower shear with my invention applied thereto.
Figure 2:
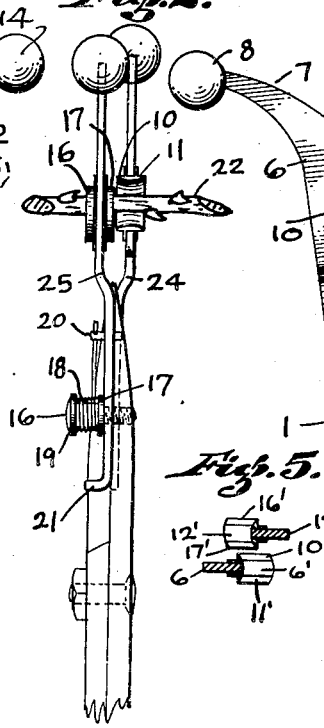
Fig. 2 is a side elevation of Fig. 1.
Figure 3:
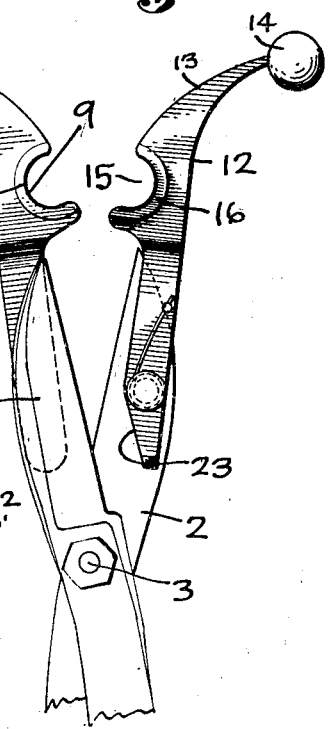
Fig. 3 is a plan view of the shears in open position with my improvement attached thereto.

The modification illustrated in Fig. 6 is essentially of the same construction as the device shown in Fig. 1. This device consists of a main member 30 provided with a handle 31 adapted to be grasped by the hand of the operator and has the other end flaring outwardly as at 32 and terminating in the counter balance 33. The outward edge of this blade is beveled to a knife edge at 34 and on its opposite side is provided with a curved gap 35 provided with the thorn cutting knives 36 respectively on opposite faces thereof. The companion member 37 is pivoted to the member 30, at 38, and consists of an outwardly flaring end 39, counter balance 40, curved gap 41 and thorn cutting knives 42 on opposite faces thereof contiguous to said gap. The tension spring 43 has an end thereof secured to the pivot 38 and has the other end thereof secured in pin 44 passing through the member 37 and which normally holds the member 37 in a position overlapping the curved gap 35 formed in the member 30. The finger projection 45 is provided adjacent the pivot 38 for manually separating the member 37 from the member 30.

The function of the thorn cutting knives on the members 6 and 12 is to strip the thorn and leaves from the stems of roses and the same is operated substantially as follows: The rose stem is carefully grasped by the operator, and the jaws 6 and 12 separate to pass the stem, then close to confine the stem between the curved gaps 9 and 15, the members 6 and 12 are then moved up and down on the stem until the thorns are stripped by the cutting knives 10, 11, 16 and 17 on the members 6 and 12 respectively. As previously mentioned it is desirable that the cutting edges be beveled back slightly away from the rubbing surfaces 6' and 12' whereby the natural cross section of the stem is not diminished.

Having thus described this invention what I claim and desire to secure by Letters Patent is:—

1. A combined thorn stripper and cutter such as described, comprising a pair of opposed members pivoted together and provided with registering curved gaps, laterally projecting cutting blades on opposite faces of each of the members contiguous to the curved gap therein, a handle on one of said members, and means for varying the position of the other member.

2. A combined thorn stripper and cutter such as described, comprising a pair of duplicate opposed members pivoted together provided with curved gaps and having outwardly flaring extensions adjacent said curved gaps; counterbalance means on the ends of said extensions; laterally projecting cutting blades on opposite faces of each of the members contiguous to the curved gaps; a handle on one of said members and means for varying the position of said other member.

3. A combined thorn stripper and cutter such as described comprising a pair of duplicate opposed members pivoted together provided with curved gaps and having outwardly flaring extensions adjacent said curved gaps; counterbalance means on the ends of said extensions; laterally projecting cutting blades on opposite faces of each of the members contiguous to the curved gaps; a handle on one of said members; means on said other member for varying the position of the same; means on said movable member for limiting the movement thereof and spring means for returning the same to normal or closed position.

4. A thorn stripping attachment for a shears comprising a pair of extensory complemental members mounted on the cutting jaws thereof, provided with registering curved gaps; means for pivotally mounting one of said extensions on one of said jaws; spring means for maintaining said pivotal member in predetermined position and laterally projecting cutting blades on opposite faces of each of said extensory members contiguous to the curved gaps.

5. A thorn stripping attachment for a shears comprising a pair of extensory complemental members mounted on the cutting jaws thereof, provided with registering curved gaps and having outwardly flaring extensions; means for pivotally mounting one of said extensions on one of said jaws; means for moving said pivoted member relative to said stationary member; spring means for maintaining said pivotal member in predetermined position and laterally projecting cutting blades on opposite faces of each of said extensory members contiguous to the curved gaps.

6. A combined thorn stripper and cutter such as described comprising complemental members pivoted together and having registering gaps in the faces thereof; laterally extending cutting blades on each of the opposite faces of each of the complemental members mounted around the peripheries of said gaps and having the cutting edge thereof beveled away from the interior of said gaps.

In testimony whereof, I have hereunto set my hand at San Francisco, California, this 23rd day of December, 1919.

FREDERIC J. BERTRAND.

In presence of—
LINCOLN V. JOHNSON.